United States Patent [19]

Wesolowski

[11] Patent Number: 4,717,950
[45] Date of Patent: Jan. 5, 1988

[54] SIGNAL PHASE CONTROL BY MEMORY CYCLE READ/WRITE GROUPS UNLOCK

[75] Inventor: Jan S. Wesolowski, Redwood City, Calif.

[73] Assignee: Ampex Corporation, Redwood City, Calif.

[21] Appl. No.: 788,354

[22] Filed: Oct. 17, 1985

[51] Int. Cl.$^4$ .......................... H04N 9/44; H04N 9/89
[52] U.S. Cl. ........................................... 358/18; 358/17; 358/323; 360/34.1
[58] Field of Search ....................... 358/17, 18, 19, 28, 358/320, 323, 326; 360/34.1, 36.1, 36.2, 37.1

[56] References Cited

U.S. PATENT DOCUMENTS

4,007,486 2/1977 Inaba et al. ............................ 358/19

Primary Examiner—James J. Groody
Assistant Examiner—Robert M. Bauer
Attorney, Agent, or Firm—Nat Kallman; George B. Almeida; Richard P. Lange

[57] ABSTRACT

An apparatus for controlling the phase of a video data signal to effect color correction includes a video data memory and memory control circuit. Interlaced write and read portions of the memory cycle are selectively spaced in time within a memory read/write cycle to enable shifting the read portion by a selected fraction of the memory read/write cycle without affecting the write portion, whereby color correction is achieved.

22 Claims, 4 Drawing Figures

FIG_2

FIG_3

SIGNAL PHASE CONTROL BY MEMORY CYCLE READ/WRITE GROUPS UNLOCK

BACKGROUND AND SUMMARY OF THE INVENTION

The invention relates to a method and apparatus for controlling a video data memory in a time base corrector to effect color correction and, more particularly, to changing the read timing of a given data memory by a fraction of the read/write cycle without affecting the write timing, and vice versa.

In the usual architecture of a digital data memory and its associated memory control logic, as typified by a random access memory operating at a selected data rate, data is written into the memory at a rate determined by the incoming data clock, and is read from the memory at a rate determined by a read clock, generally operating at some reference frequency. The read and write portions of the memory cycle generally are interlaced and interlocked so as to provide a selected synchronization between the writing and reading processes. However, there are situations where the read or write cycles may be asynchronous to allow the selective delay of incoming or outgoing data. In these situations, the delay time is changed by an integer number of the memory cycles corresponding to the relationship selected between write and read addresses. That is, present data memories and their associated control logic are not capable of changing, (i.e., shifting or delaying) the read timing or write timing relative to each other by a fraction of the read/write cycle. However, it is disadvantageous in some fields to not be able to unlock the read/write timing, that is, to not be able to delay, for example, the read timing relative to the write timing by a fraction of the read/write cycle. This disadvantage is exemplified in the field of time base correction of video signals.

Thus, by way of example only, in a video tape recording system (VTR), a time base corrector (TBC) generally is employed to compensate for distortions of the time base of the off-tape video signal by means of a variable delay. In presently known time base correctors the variable delay is accomplished by employing a digital memory to store data representing the input video signal and to enable readout with proper phase relative to a reference signal.

Conventionally, the video signal is sampled at a rate that is too high for those semiconductors which are economically feasible for use in VTR systems. In order to slow down the data rate to just below the semiconductor's speed, the samples of the video signal are first collected in pairs and later, before storage in the main memory of TBC, in blocks consisting of a number of pairs. The pairs are processed at twice the color subcarrier frequency. The rate of writing and reading the data blocks is dictated by the speed of the memory chips, which may be 250 nanoseconds for example. A single block may be as large as 5 or 6 pairs, the total of 90 or 108 bits wide. Each block is stored at a single address in the digital video memory. For each memory cycle, one block of video data is written in and one block is read out of the memory in an interlaced read/write manner. After readout from the memory the blocks are disassembled into pairs.

The relationship (usually called color sequence) between vertical synchronizing pulses, horizontal synchronizing (sync) pulses, and color burst in a color video signal according to the NTSC standard results in a sequence of four different fields (two different color frames) consisting of two different types of lines. The relationship in PAL color video signal results in an eight field sequence and four different types of lines. The different types of lines may be represented within TV equipment by an H/2 signal in NTSC color television standard, and by H/4 and H/2 signals in PAL and PAL-M standards.

In a VTR record-reproduce process, and in still frame or slow motion playback in particular, the color sequence may become distorted and needs to be regenerated by time base correction. In this process the sync generator, which may be a part of the TBC system, signals which line type is required at any given moment of time. Generally, in prior art time base correction systems of a VTR, the proper relationship of vertical and horizontal sync with respect to each other and with respect to the other video signals in the TV studio is restored by means of a variable delay. The proper relationship between horizontal sync and color burst is restored by using proper filtering for separating luminance and chrominance components of the video signal and by demodulating the color subcarrier down to color modulating components, which are then used to modulate a new subcarrier having a standard relationship to horizontal sync. However, with this approach, degradation of picture quality is known to occur.

Therefore, it would be desirable to make the correction by shifting the active video portion of the composite video signal horizontally by the required fraction of the subcarrier cycle or vertically by a horizontal line, or by a combination of both, with respect to the sync and burst portions of the video signal. However, in presently known time base correctors which incorporate a digital memory as means of variable delay, as previously mentioned, it is not possible to shift the video data at the output of the memory by a fraction of the memory read/write cycle without disturbance of the write function of the memory, because the write and read portions of the memory cycle are interlaced and interlocked. It is only possible to shift in increments of one block and thus the delay time cannot be changed by the exact amount needed.

Accordingly, in a TBC system in particular, in some modes of operation it would be a distinct advantage to provide color correction by shifting the color signal horizontally by the required fraction of the subcarrier cycle. Further, in audio or video data memories wherein digital or analog signals are being processed, there are situations where it would be a distinct advantage to be able to control the timing of the read process relative to the write process, i.e., to unlock the read/write groups controlling the data memory and shift the read or write timing by a fraction of the read/write cycle.

The invention provides the advantages of previous mention by providing a data memory control circuit wherein the interlaced write and read portions of a memory cycle are suitably selected (for example condensed) in time to provide enough free time space within a memory cycle to enable shifting of the write or read portion independently of the read or write portion respectively. In a TBC system this allows correction of the color sequence of a video signal by shifting the color signal horizontally by the required fraction of the subcarrier cycle.

According to the invention, groups of write pulses and read pulses are formed by common circuitry. The timing relationship between the write and read groups is determined by the relationship between pulses which trigger the generation of each group. By way of example, in a time base corrector system, the read group trigger pulse is shifted with respect to a time base correction reference by an amount required for color sequence correction, within available free time limits of the memory cycle. The shift of the read trigger pulse results in a corresponding shift of the read group pulses, and a resulting shift of the data output from the video data memory and the active video portion of the video signal relative to the time base corrector output sync and burst signals. That is, although the read and write portions are still interlaced, they no longer are interlocked which allows shifting the read portion within available time space within the read/write cycle with the resulting attendant shift in the data output for purposes of color correction.

As previously mentioned, the invention is equally applicable in data memories other than those used in the time base correction process of previous mention, and for purposes other than color correction in video signal processing, as is further understood by the description below in the specification.

BRIEF DESCRIPTION OF THE DRAWINGS

The invention will be described in detail with reference to the drawings in which:

FIGS. 3A–J are a series of waveforms representing the relationship between the write groups and read groups of memory control pulses when no delay is needed and when a half subcarrier period delay is required and read/write unlock is effected.

DESCRIPTION OF THE PREFERRED EMBODIMENT

Although the invention particularly is described herein in the environment of a TBC for effecting a color correction phase shift at the output of the TBC main memory, it is to be understood that the invention contemplates application with audio as well as video data memories wherein digital or analog signals are being processed and where there is a need for changing the read timing, or the write timing, by a fraction of the read/write cycle.

During operation of the phase correction circuit of this invention, all pulses required to write one block of data into the video data memory or read one block of data from the memory are grouped into write groups and read groups, which are generated by the common circuitry.

Figure 1A:
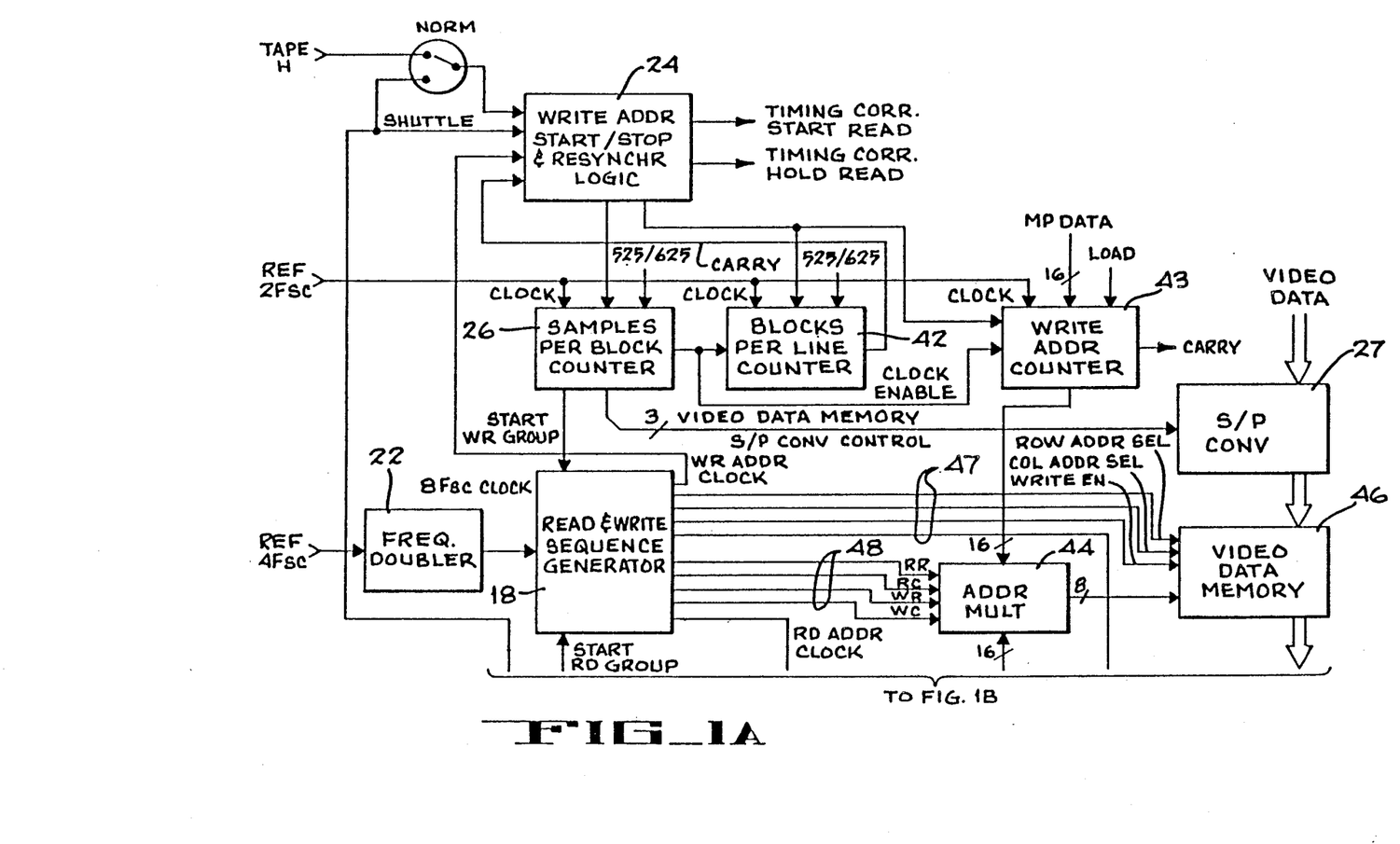
FIGS. 1A and 1B are a schematic block diagram illustrating the novel color sequence correction circuit of this invention.
Figure 1B:
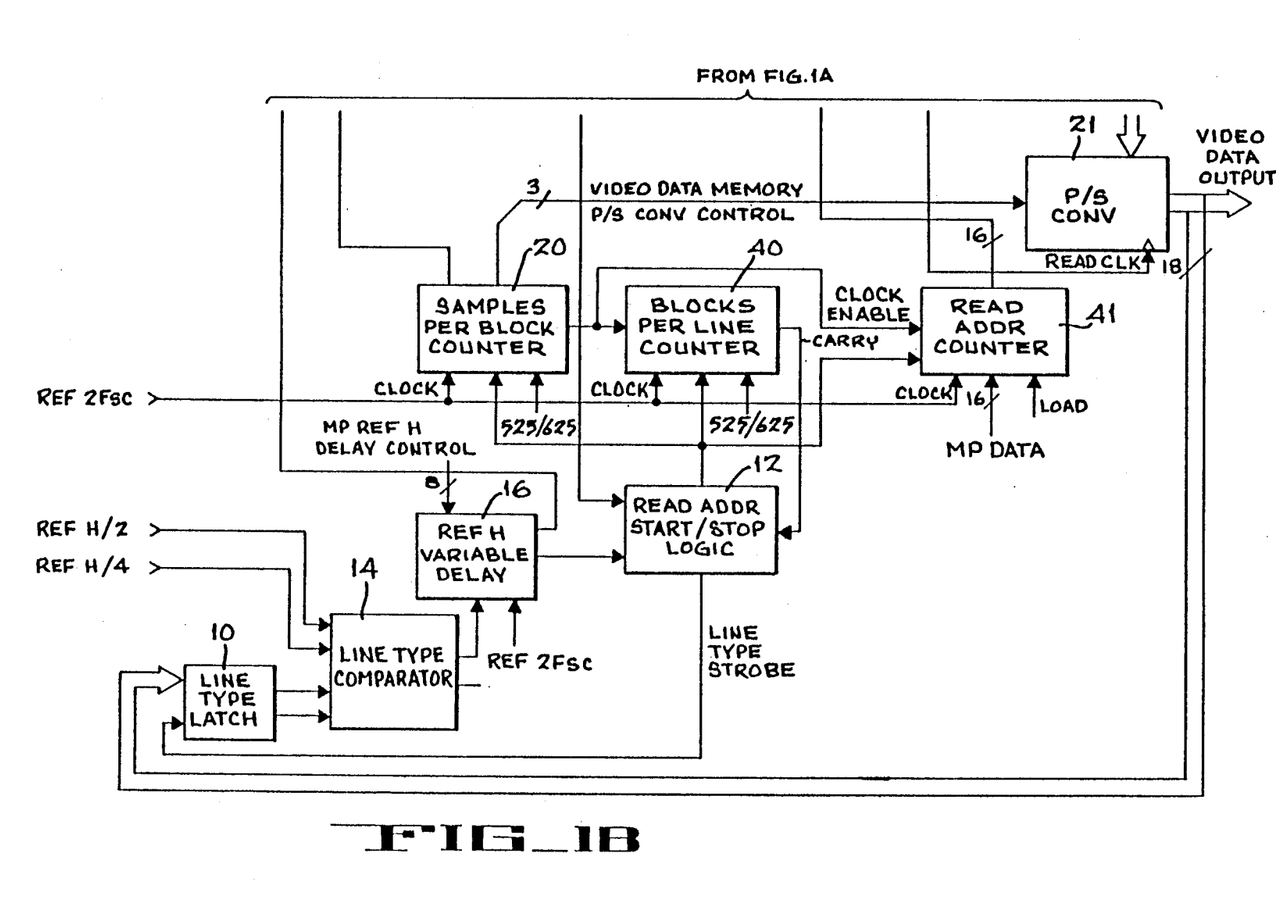

With reference to FIG. 1, video data signals are obtained from the TBC's main video data memory (herein shown at numeral 46) and applied to the input of the line type latch 10. The latch 10 operates to identify the type of horizontal line that is present at any given time at the output of the memory by means of extracting a line type sample from the video data.

The line type sample representing the type of the next horizontal line to be written in the memory 46 is inserted in the video data during horizontal blanking at the input of the memory. A strobe pulse that is obtained from a read address start/stop logic circuit 12 enables loading the line type sample in the latch 10 which passes the memory output line type signal to a line type comparator 14. The comparator receives a reference signal, H/2 for NTSC standard (or H/2 and H/4 signals for PAL standard), where H is the frequency of the horizontal sync pulse. The reference signal represents the line type required for correct color sequence. The logic levels of the memory output line type and required line type are compared and an error or difference signal is generated and fed to a control input of a variable delay circuit 16, whose other input is a fixed reference H sync pulse. The delay circuit 16 provides a delayed reference H signal which is used as a shift enable signal to determine the phase of the video data read in relation to the phase of the reference H sync pulses.

The line type comparator 14 detects and thus determines when a read group shift is required (or could determine when a write group shift is required depending on the application). To this end, the output from the video data memory 46 is strobed into the line type latch 10 wherein the line type inserted at the beginning of each line is extracted from the video data and fed to the line type comparator 14 as two bits of the line type word. The comparator 14 compares the line type required with the line type available (which also takes into account the color television standard being operated). The output from the comparator 14 initiates the start read group pulse of previous mention via the read address start/stop logic circuit 12 and a counter 20, advanced by a 2Fsc clock period in accordance with the invention.

The output of the delay circuit 16 is applied to the read address start/stop logic circuit 12. The read address start/stop logic actuates samples per block counter 20 that determines the number of reference 2Fsc (twice the frequency of the subcarrier) clock pulses that correspond to one block of video data. This number may be 5 representing five pairs of video samples in NTSC standard operation, or 6 representing six pairs of samples in PAL standard. The counter 20 supplies a narrow read trigger pulse as a start read group pulse to a read/write sequence generator 18. The output of the counter 20 also controls a parallel/serial converter 21 at the output of the video data memory 46 which disassembles blocks of video samples into pairs of samples of 9 bits each. The read address start/stop logic 12 also enables a block per line counter 40 that determines the number of data blocks (video data memory addresses) corresponding to one horizontal video line. This number may be 81 for NTSC, or 85 for PAL operation. The read address start/stop logic 12 also enables a read address counter 41 to generate addresses to select locations of the video data memory 46 for reading. The addresses are controlled via an address bus and a load signal supplied to the read address counter 41 via a microprocessor (not shown) as when addressing a data memory, and further discussed below. At the end of the blocks per line count, the counter 40 supplies a carry to the read address start/stop logic 12 to reset the latter, which resets in turn the samples per block counter 20 and the blocks per line counter 40 and disables the read address counter 41.

Similarly, a counter 26 in the write channel establishes the number of samples per block, and a counter 42 establishes the number of blocks per line for the purpose of generating the write addresses. The output of the counter 26 controls a serial/parallel converter 27 at the input of the video data memory 46 assembling pairs of video samples into blocks. A write address start/stop and resynchronizing logic circuit 24 acts to enable and reset counters 26 and 42, and to enable and disable the write address counter 43 as previously described for the read channel. A narrow write trigger pulse representing a start write group pulse is supplied to the sequence generator 18 via the counter 26 and the write address start/stop and resync logic circuit 24, and is synchronous with a tape horizontal sync signal, tape H, supplied to the circuit 24. The tape H signal marks the beginning of a horizontal line for incoming data. The major timing rate of the data intervals is the 2Fsc or video data bus rate. The major memory interval rate for changing write addresses is the frame block rate of 2/5 Fsc in NTSC, and ⅜ Fsc in PAL.

The read/write sequence generator 18 is clocked by a 8Fsc clock and generates a set of read group signals in response to the start read group pulse, and a set of write group signals in response to the start write group pulse. The read and write group signals thus are synchronous with respective start read and start write pulses and accordingly the timing thereof may be shifted or delayed by a corresponding shift of the start read, or start write, pulse, as further described below. The group signals are coupled to the data memory 46. The sequence generator 18 also supplies a series of clock signals to control an address multiplexer 44.

The address multiplexer 44 is coupled to the sequence generator 18 and switches between the outputs from the address counters 41 and 43 for the read and write modes, and also splits the outputs into row and column addresses. In the time base corrector environment used herein by way of example only, the address multiplexer 44 is an 8-bit chip selected for reasons of size and economy. The inputs to the multiplexer are two 16-bit address buses supplied by the read and write address counters 41, 43 wherein the addresses are write row/column addresses and read row/column addresses for selecting the locations by row and column in the video data memory 46 for writing and reading operations. The address multiplexer 44 supplies thus the following 8-bit addresses to the video data memory 46; a write row address (WRA), a write column address (WCA), a read row address (RRA) and a read column address (RCA). The addresses are sequentially supplied to the memory 46, to define the location by row and column, in response to clock signals write row (WR), write column (WC), read row (RR) and read column (RC), fed to the multiplexer via control lines 48, wherein the clock signals are synchronous with the clock signals row address strobe (RAS), column address strobe (CAS), read clock (RCK) and write enable (WE) which the sequence generator 18 supplies to the data memory 46.

More particularly the data memory 46 illustrated is a dynamic random access memory (DRAM). Generally such memories are assembled by connecting together integrated circuit chips of a particular address length which are one bit wide. The lengths of these integrated circuit chips are available in multiples of powers of two for binary addressing schemes such as 32k, 64k and 128k. In the memory shown in the FIG. 1, to insure enough memory space to store 625 H lines of 85 frame blocks per line, 64k length integrated circuits are used. For a 5 (6 in PAL) word length frame block, 90(108)- bits are needed and thus, the data memory 46 links 90(108) of the 64k integrated circuit chips together to form the memory. Herein the memory 46 is refreshed by selecting 8 least significant bits of write and/or read address. This makes sure that all 256 rows of memory are repeatedly selected at least once within every 4 ms.

To read and to write information to and from the (DRAM) data memory 46 requires four clock signals and a memory address. The reading of information from the memory is accomplished by generating the row address strobe or clock signal RAS, while addressing the memory 46 with the row address, and generating the column address strobe or clock signal, CAS while addressing the memory with the column address. In response to that, the data from the particular location chosen is presented by the memory at its output terminals and may be clocked by the read clock signal (RCK) into another connected device. Conversely for writing data into the data memory 46, the RAS signal is generated in coincidence with the memory row address and the CAS signal is generated in coincidence with the memory column address signal, thereby selecting the particular location in the data memory 46 to be written into. Data is then applied to the data ports and the write enable signal WE is generated to clock the presented data into the respective location.

The write and read address counters are loaded at the beginning of tape field and reference field, respectively, with initial numbers supplied by the memory control microprocessor (not shown) and selected in order to allocate a predetermined area of the memory for each field.

The read and write clock signals RAS, CAS, RCK, WE for the data memory 46 are generated by the sequence generator 18 as previously discussed. The generation of the read group signals are begun synchronously with the start read group pulse applied to the start read input of the generator 18. Likewise, the generator 18 begins the generation of the write group signals in synchronism with the start write group pulse applied to its start write input. Generally, the sequence generator 18 causes a block (5 or 6 words) of data to be written into the data memory 46 during one part of a memory cycle and causes a frame block to be read from the memory during the remaining part of a memory cycle.

The particular address at which the data is read from or written into the data memory 46 is determined by the combined counters 20, 40, 41 and the read address start/stop logic circuit 12 for the read address, and by the counters 26, 42, 43 and the write address start/stop and resync logic circuit 24 for the write address. The write address is applied to one port of the address multiplexer 44 that times the address into two 8-bit addresses output to the data memory address inputs. The address multiplexer 44 multiplexes the 16-bit write address needed to select 64K memory locations into two 8-bit addresses which define a location by row and column in the 64k memory matrix as previously mentioned. The address multiplexer 44 performs this operation in response to clock signals RR, RC, WR, WC generated by the sequence generator 18 which are synchronous with the clock signals RAS, CAS, RCK, WE it generates for the data memory 46.

In the case of a write address, the write address counter 43 applies the write address to the inputs of the multiplexer 44 and the sequence generator 18 applies the write row signal WR to the multiplexer to select the first 8-bits of the write address and send them to the data memory 46. The signal WR is synchronous with the row address strobe RAS and defines the row location in the memory matrix. Thereafter, synchronously with the column address strobe signal CAS, the sequence generator 18 generates a write column signal WC to the address multiplexer 44. In response to this signal, the address multiplexer then selects the second 8-bits of write address and applies them to the memory address inputs.

In a similar manner, the read address is supplied via the address multiplexer 44 into the address inputs of the data memory 46. The signals causing the multiplexing are the read row signal RR and the read column signal RC from the sequence generator 18. The signal RR is operated synchronous with the RAS signal and the signal RC is generated synchronous with the CAS signal.

Input video data is delivered to the data ports of the data memory 46 through the serial/parallel converter 27, and data output from the memory data ports is received by the parallel/serial converter 21. The converter 27 receives the video data at the video data bus rate of 2Fsc as sequential words, 18-bits in length, and under control of the address selection signals from the counter 26 assembles the incoming words into a 5(6) word blocks of 90(108)-bits which are output from the converter. A block of 5 words, 90-bits, is used for 525 lines TV standard and a block of 6 words, 108-bits, is used for 625 lines TV standard. The serial/parallel converter outputs are enabled during the write cycle of the memory 46 in synchronism with the write enable signal WE to transfer the block into the memory.

During the read cycle, the parallel/serial converter 21 is enabled synchronously with the read clock signal RCK to receive a block of data output from the memory 46 and to clock it into its data input ports. The converter 21 thereafter, under control of address selection signals from the counter 20 serializes the block into 5(6) words of 18-bits at the 2Fsc data rate. The output of these words from outputs of the converter 21 become the output from the frame memory and are used in further processing of the video data stream.

As shown further below, the write group pulses and the read group pulses are selected to not occupy an entire half of the memory read/write cycle. Since the clock pulses are initiated by and thus are synchronous with the start write group and start read group pulses, the read and write cycles can be unlocked by moving either the start write, or start read, group pulse with respect to the beginning of the write or read half cycle. Since the incoming video data is from an exterior source in the example described and should not be disturbed, it is preferable herein to move the read group signals relative to the beginning of the read cycle by a 2Fsc clock period without disturbing the write timing. This corresponds to shifting the data output from the data memory 46 180° of the color subcarrier cycle to provide color correction. Obviously, in situations where the incoming data is not fixed relative to an exterior system timing, it is equally possible to shift the write group signals relative to the read group signals without disturbing the read timing. Likewise, depending upon the application of the data memory, the change of timing relationship between the write and read groups may be other than 2Fsc.

Figure 2:
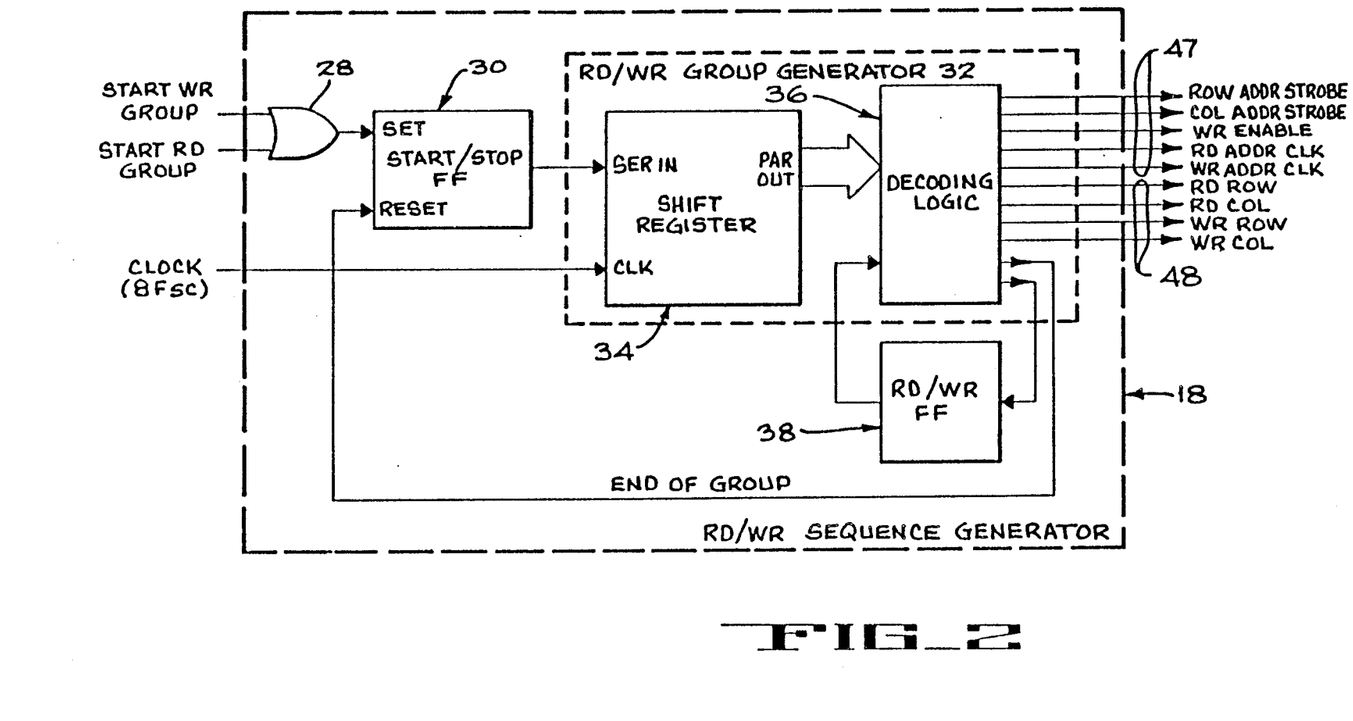
FIG. 2 is a schematic block diagram of the read and write sequence generator employed in the circuit of FIG. 1.

In a preferred embodiment of this invention, the narrow pulses which mark the time for writing a block of data in memory and time for reading a block of data from memory are passed in an interlaced manner from the start/stop logic circuits 24 and 12, as the trigger pulses to the read/write sequence generator 18, which is illustrated in greater detail in FIG. 2. Each start pulse passes through an OR gate 28 and sets the start/stop flip-flop 30. The logic high output from the flip-flop is clocked serially via a subcarrier-related clock described below into a read/write group generator 32 consisting of a shift register 34 and decoding logic circuit 36. The decoding logic 36 receives the parallel output of the shift register 34 and generates all the write/read group pulses required to control writing and reading of a single block of data. It generates also an end-of-group pulse which resets the start/stop flip-flop 30, and prepares the read/write sequence generator 18 for the next start pulse and generation of the next group. A clock pulse is provided by the decoding logic 36 to a read/write flip-flop 38, which controls the interlaced generation of the read and write groups. The state of the flip-flop 38 delineates the read and write modes.

The length of the register 34, the frequency of its clock, and the phase relationship between the clock and the read/write groups start pulses, as well as complexity of the decoding logic 36, are determined by the required resolution of the group generation. The frequency of the clock also determines the duration of each group and the space between groups in the write/read cycle. The timing relationship between the read groups and the write groups is determined by the relationship between the start pulses that trigger the generation of each group. In this TBC environment, by way of example only, a shift of the read group trigger pulse with respect to the time base corrector reference by the amount required for color correction (within the available time space) causes the read group of pulses, the video data at the output of the video data memory 46, and the video at the output of the TBC to shift accordingly with relation to the TBC output horizontal sync and burst.

In a preferred embodiment of the invention, the eight bit serial input/parallel output shift register 34 is clocked by the 8Fsc clock (at eight times color subcarrier frequency) obtained from a frequency doubler 22, which receives a reference 4Fsc signal (FIG. 1A). At this clock frequency and the length of the register, the write and read groups of pulses are generated with the minimum duration allowed and the resolution required by the relatively inexpensive memory chips used in the video data memory 46. Signals generated by the read/write sequence generator 18 on line 47 are utilized for row address selection (FIG. 3B), column address selection (FIG. 3C) and write enable (FIG. 3D). The generator 18 produces a write address clock (FIG. 3E) that is provided to the write address start/stop and resync logic circuit 24 and a read address clock (FIG. 3F) that is provided to the read address start/stop logic circuit 12. The generator 18 also provides the control clocks RR, RC, WR, WC for application to the address multiplexer 44 via lines 48 as previously described.

Figure 3:
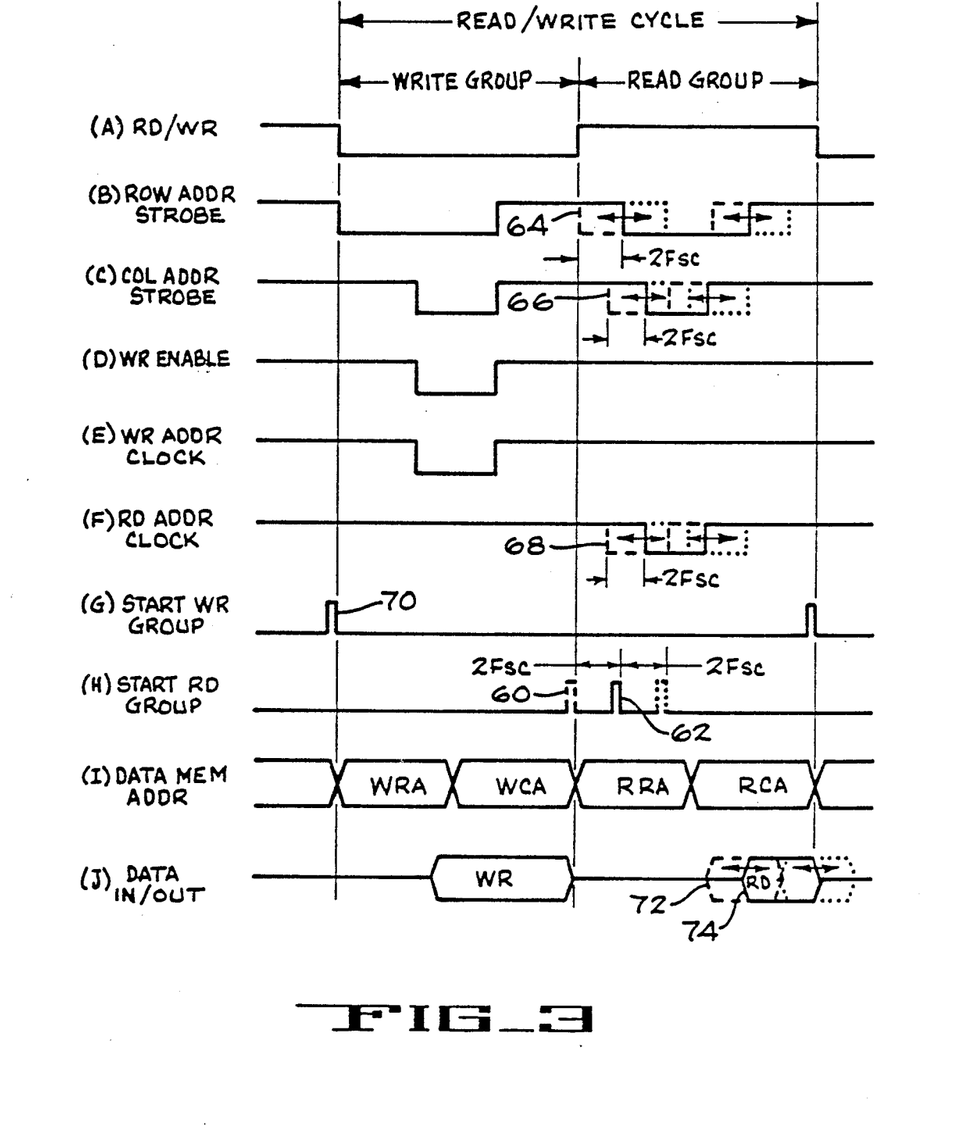

More particularly, referring to FIG. 3, there are depicted waveforms of the various signals and clocks discussed with reference to FIGS. 1, 2, further depicting the shifting of the read group signals relative to the write group signals by a 2Fsc clock period without disturbing the timing of the write group signals. In accordance with the invention, the write group and read group signals are selected with decreased time durations whereby there is time space available between the write and read half cycles during which either the write or read group signals may be shifted relative to the other. To this end, by way of example only, when the line type comparator 14 determines that a different line type is required and a read shift is necessary, the start read group pulse 60 of FIG. 3H is supplied to the read/write sequence generator 18 a 2Fsc clock period earlier than the normal pulse 62. Since the row and column address strobes and the read address clock are generated as a group, they also are generated a 2Fsc clock period earlier as shown in FIGS. 3B, 3C and 3F by numerals 64, 66 and 68 respectively. The negative edges of the narrow pulse 60 initiates the various read clocks as previously described in FIG. 2. The start write group pulse 70 of FIG. 3G is not affected, nor are the various clocks of the write group shown in FIGS. 3B, 3C, 3D and 3E. FIG. 3I depicts the timing for the video data memory 46 write row and column addresses and the read row and column addresses which occur in combination with respective select signals for write, read, row address and column address supplied to the data memory 46, as previously described. The video data is written into the data memory 46 during the write group half cycle, and is read from the memory in response to the read group signals at a 2Fsc clock period earlier. The change in timing relationship is shown by numeral 72 and depicted in the waveform of FIG. 3J. When a read group shift is not required, the data is read from the data memory 46 at normal read timing and depicted by numeral 74.

As depicted by the dotted portions of the read group signals, FIGS. 3H and 3B, 3C, 3F, if sufficient time space is available between the write and read groups of a read/write cycle, the start read group pulse of FIG. 3H may be delayed by 2Fsc rather than advanced, whereby the read group signals and the read timing of the data memory 46 (FIG. 3J) are delayed by 2Fsc relative to the write group signals and process.

By virtue of the novel circuit disclosed herein, the timing of the read group of pulses generated by the read/write sequence generator 18 is controlled in accordance with the variable delay that compensates for any difference between the type of video horizontal line required by the reference and the type of video horizontal line received with the video data from memory. The read portion of the memory cycle is effectively shifted within the available time period without impacting the write portion of the cycle.

It should be noted that the inventive concept is applicable to video systems employing NTSC, PAL and PAL-M color television standards. Also, the function of delay provided by the shift register used in the read/write sequence generator 18 may be performed by a multi-tap delay line.

What is claimed is:

1. A phase control circuit for correcting the color sequence of a video signal comprising:
   data memory means for processing video data signals via a memory read/write cycle, during which video data are written into and read from the data memory means;
   means for providing line type information indicative of successive horizontal lines of said video data signals;
   means for comparing said line type information to reference line type information to generate a shift enable signal indicative of the timing of the video data; and
   means responsive to the shift enable signal for shifting the timing of reading the video data signals from said data memory means by a fraction of the memory read/write cycle without shifting the timing of writing the video data signals into said data memory means.

2. A phase control circuit as in claim 1, wherein the video data are written into and read from the data memory means during a read portion and a write portion of the memory read/write cycle, which portions together are less than the period of the read/write cycle to provide free time space within the memory read/write cycle.

3. A phase control circuit as in claim 1, including means, coupled to the input of said providing means, for generating a line type strobe pulse indicative of the line type information.

4. A phase control circuit as in claim 1, wherein said shifting means includes:
   a read address start/stop logic circuit;
   a variable delay circuit, coupled to the input of said read address start/stop logic circuit, for providing delayed reference horizontal pulses; and
   a counter, coupled to the output of said logic circuit, for counting video data blocks for each horizontal line.

5. A phase ontrol circuit as in claim 1 wherein the shifting means includes:
   a first sample-per-block counter for counting pairs of video samples per block of video data written into said data memory means and for generating a start write pulse;
   a write address start/stop and resync logic circuit, coupled to the input of said first counter, for phasing said first counter with horizontal sync pulses derived from the video data being written into said data memory means;
   means for supplying delayed reference horizontal pulses representative of said line type information;
   a second sample-per-block counter for counting pairs of video samples per block of video data read from said data memory means and for generating a start read pulse;
   a read address start/stop logic circuit coupled to the input of said second counter, for phasing said second counter in response to said delayed reference horizontal pulses; and
   a read/write sequence generator for generating write groups of pulses in response to the start write pulse to control writing of said video data into said memory source, and for generating read groups of pulses in response to the start read pulse to control said shifted reading of said video data from said data memory means in response to the delayed reference horizontal pulses.

6. A phase control circuit as in claim 1 including:
   a line type comparator circuit for comparing said line type information to said reference line type information; and
   a reference horizontal variable delay circuit, coupled to said line type comparator output, for varying the shift enable signal by a required preset amount of time.

7. A phase control circuit as in claim 1 wherein the shifting means includes:
   means, including counter means, for supplying a start write pulse and a start read pulse; and read/write cycle generator means for enabling the writing of the video data signals into the data memory means in response to the start write pulse, and for enabling the time shifted reading of the video data from the data memory means by a fraction of the read/write cycle in response to the start read pulse.

8. A phase control circuit as in claim 7, wherein said read/write cycle generator means includes:
a start/stop flip-flop set by said start pulses;
a multi-tap delay device coupled to the output of said start/stop flip-flop;
a decoding logic circuit coupled to the output of said delay device;
wherein the cycle generator means, in response to one of the start pulses, generates a write group of pulses to control the timing of the write function of said data memory means, and in response to another start pulse, generates a read group of pulses to control the timing of the read function of said data memory means; and
wherein the timing of the write timing group or of the read timing group may be shifted within a read/write cycle without shifting the timing of the other group.

9. A phase control circuit as in claim 8, wherein said multi-tap delay device comprises:
a shift register with serial input and parallel outputs; and
a clock generator for providing clock pulses to said shift register.

10. A phase control circuit as in claim 8, wherein said multi-tap delay device comprises:
a pulse delay line with multiple output tap, wherein the number of taps and the delay time for each tap establish the timing relationship of the pulses generated by said read/write sequence generator.

11. A method for changing the phase of a video data signal, wherein the video data are written into and read from a data memory during a memory read/write cycle, comprising:
providing line type information indicative of successive line types of the video data siganl;
comparing the line type information to reference line type information to generate a shift enable signal; and
shifting the timing of reading the video data from said data memory by a fraction of the memory read/write cycle determined by said shift enable signal, and without shifting the timing of writing the video data into said memory, to change the phase of the video data signal.

12. A method as in claim 11, including generating a line type strobe pulse indicative of the line type of the video data while it is being read out from said data memory.

13. A method as in claim 11, including:
counting pairs of video samples per block of video data written into said data memory;
counting blocks of video samples per horizontal line of video data written into said data memory;
counting blocks of video samples per horizontal line of video data read from said data memory;
generating a write group of pulses to control writing of said video data into said data memory source within a period of said memory read-write cycle; and
generating a read group of pulses which are selectively shifted in timing within the memory read/write cycle, by said fraction of the cycle, in response to the shift enable signal.

14. A method as in claim 11, wherein the step of shifting includes:
providing read and write time portions within the period of the memory read/write cycle, wherein the combined time portions are leass than the period of the cycle to provide free time space within the memory read/write cycle period for said shifting of the read portion timing by said fraction.

15. A circuit for controlling the phase of a signal being processed via a data memory responsive to write and read address signals occurring during a read/write cycle period, comprising:
means for separately generating the write and read address signals within the read/write cycle period; and
means, coupled to the generating means, for alternately applying to said data memory said write address signal for a portion of the read/write cycle period, and said read address signal for another portion of the read/write cycle period, wherein the total of said portions is less than the read/write cycle period to provide a preselected time space between the two portions.

16. The circuit of claim 15 including:
means, coupled to the applying means, for providing a signal indicative of the need for shifting the timing of the address siganl which is to be shifted.

17. The circuit of claim 16 wherein the applying means includes:
means for generating a start write group signal in response to the rate of incoming data;
means for generating a start read group signal in response to a reference rate; and
address generating means, coupled to the data memory, for supplying thereto write group signals synchronous with the start write group signal and read group signals synchronous with the start read group signal.

18. The circuit of claim 16 wherein the signal is a video signal having a subcarrier frequency and wherein:
the providing means includes means for comparing the line type being recovered with a required line type and for supplying a shift enable signal to the applying means in the event the line type is not that required.

19. The circuit of claim 18 wherein the start read group signal is shifted an amount of time corresponding to a period of twice the subcarrier frequency in response to the shift enable signal, and said read group signals are synchronously shifted by the corresponding period to shift accordingly the video data being read from the data memory.

20. A circuit for controlling a video data memory to allow color correction of a video signal, comprising:
comparator means for providing a shift enable signal indicative of whether the video signal requires color correction;
means, coupled to the comparator means, for supplying a start write group pulse and a start read group pulse during a corresponding read/write cycle;
generator means for generating write group and read group signals in response to and synchronous with the start write group pulse and the start read group pulse respectively, wherein the write group and read group signals do not cover the period of the read/write cycle;

address means, coupled to the supplying means, for generating write address and read address signals; and multiplexer means, coupled to the address means, for selectively applying the write and read address signals to the video data memory in response to the write group and read group signals.

21. The circuit of claim 20 wherein:

said supplying means supplies the start read group pulse at a time shifted by a fraction of the read/write cycle relative to the start write group pulse, in response to the shift enable signal; and said generating means generates the read group signals within the read/write cycle in response to the shifted start read group pulse, to correspondingly shift the read address signals without shifting the write address signals, to provide the color correction.

22. The circuit of claim 21 including:

means for providing a 2Fsc clock; and wherein said start read group pulse is shifted by a time period of the 2Fsc clock to provide the color correction.

* * * * *